US010941753B2

(12) United States Patent
Warchol

(10) Patent No.: US 10,941,753 B2
(45) Date of Patent: Mar. 9, 2021

(54) TEMPORARY WEB SUPPORT FOR WIND TURBINE BLADE ROTATING DEVICE

(71) Applicant: TPI Composites, Inc., Warren, RI (US)

(72) Inventor: Nicholas Warchol, Akron, OH (US)

(73) Assignee: TPI Composites, Inc., Warren, RI (US)

( * ) Notice: Subject to any disclaimer, the term of this patent is extended or adjusted under 35 U.S.C. 154(b) by 0 days.

(21) Appl. No.: 16/869,004

(22) Filed: May 7, 2020

(65) Prior Publication Data

US 2020/0271099 A1    Aug. 27, 2020

Related U.S. Application Data

(63) Continuation of application No. 16/129,398, filed on Sep. 12, 2018, now Pat. No. 10,677,222.

(60) Provisional application No. 62/729,502, filed on Sep. 11, 2018.

(51) Int. Cl.
| | |
|---|---|
| *F03D 1/06* | (2006.01) |
| *F03D 13/10* | (2016.01) |
| *B29D 99/00* | (2010.01) |
| *B29K 309/08* | (2006.01) |

(52) U.S. Cl.
CPC ......... *F03D 13/10* (2016.05); *B29D 99/0028* (2013.01); *B29K 2309/08* (2013.01); *F05B 2230/23* (2013.01); *F05B 2230/604* (2013.01); *F05B 2240/21* (2013.01)

(58) Field of Classification Search
CPC .............. F03D 13/10; B29D 99/0028; F05B 2230/604; F05B 2230/23; F05B 2240/21
See application file for complete search history.

(56) References Cited

U.S. PATENT DOCUMENTS

| 7,895,745 | B2 | 3/2011 | Althoff et al. |
| 8,075,275 | B2 | 12/2011 | Althoff et al. |
| 8,167,569 | B2 * | 5/2012 | Livingston .............. F03D 13/10 |
| | | | 416/224 |
| 2008/0219851 | A1 | 9/2008 | Althoff et al. |
| 2009/0087318 | A1 | 4/2009 | Althoff et al. |
| 2010/0310379 | A1 * | 12/2010 | Livingston .............. F03D 13/10 |
| | | | 416/229 R |
| 2015/0167473 | A1 | 6/2015 | Olson |
| 2018/0142670 | A1 | 5/2018 | Garm |
| 2020/0079789 | A1 | 3/2020 | Torres et al. |
| 2020/0080543 | A1 | 3/2020 | Warchol |

FOREIGN PATENT DOCUMENTS

WO    WO-2020/055398 A1    3/2020

OTHER PUBLICATIONS

International Search Report and Written Opinion for International Application No. PCT/US18/50680 dated Nov. 15, 2018.

* cited by examiner

*Primary Examiner* — Eldon T Brockman
(74) *Attorney, Agent, or Firm* — Stephen J. Kenny; Foley Hoag LLP

(57) ABSTRACT

Provided herein is a shear web support for wind turbine blade. Particularly, the present disclosure provides a frangible shear web support element that is designed to fail under certain specific conditions. The frangible support(s) enhance the structural rigidity of the shear web, allow for one-step mold closures, and rupture or disconnect once a predetermined condition (e.g. load threshold, load orientation/vector) is applied to the support element.

20 Claims, 7 Drawing Sheets

TEMPORARY WEB SUPPORT FOR WIND TURBINE BLADE ROTATING DEVICE

CROSS-REFERENCE TO RELATED APPLICATIONS

This application is a Continuation of and claims the benefit of priority under 35 USC 120 to U.S. patent application Ser. No. 16/129,398 filed Sep. 12, 2018, which claims the benefit under 35 USC 119 of priority to U.S. Provisional Application No. 62/729,502 filed Sep. 11, 2018, the entire contents of each are hereby incorporated by reference.

BACKGROUND OF THE DISCLOSED SUBJECT MATTER

Field of the Disclosed Subject Matter

The disclosed subject matter relates to a system, and corresponding method, of manufacturing large scale composite structures, e.g. wind turbine blades. These large scale composite structures are typically formed from a two-piece mold which, once the blade halves are molded, require a complex mold closure process to complete fabrication.

Particularly, the present disclosure provides structural elements which facilitate a one-step mold closure technique by employing a support element to maintain the web to be substantially free standing within a mold half.

Description of Related Art

Wind turbine blades generally comprise a hollow blade shell made primarily of composite materials, such as glass-fiber reinforced plastic. The blade shell is typically made up of two half shells, a lower pressure-side shell and an upper suction-side shell, which are molded separately in respective female half molds, before being bonded together along flanges at the leading and trailing edges of the blade. This method of manufacturing a blade is illustrated schematically in FIG. 1a.

Referring to FIG. 1a, this shows a mold 10 for a wind turbine blade divided into two half molds, an upper suction-side mold 10a and a lower pressure-side mold 10b, which are arranged side by side in an open configuration of the mold. A pressure side blade shell 12a is supported on a mold surface 14a of the lower mold 10a and a suction side blade shell 12b is supported on a mold surface 14b of the upper mold 10b. The shells 12a, 12b are each made up of a plurality of glass-fiber fabric layers, which are bonded together by cured resin.

After forming the shells 12a, 12b in the respective mold halves 10a, 10b, shear webs 16 are bonded to an inner surface 17 of the windward blade shell 12a. The shear webs 16 are longitudinally-extending structures that bridge the two half shells 12a, 12b of the blade and serve to transfer shear loads from the blade to the wind turbine hub in use. In cross-section, as shown in FIG. 1a, the shear webs 16 each comprise a web 18 having a lower edge 19 comprising a first longitudinally-extending mounting flange 20 and an upper edge 21 comprising a second longitudinally-extending mounting flange 22. Adhesive such as epoxy is applied along these mounting flanges 22 in order to bond the shear webs 16 to the respective half shells 12a, 12b.

As shown in FIG. 1b, once the shear webs 16 have been bonded to the upper blade shell 12a, adhesive is applied along the second (upper) mounting flanges 22 of the shear webs 16, and along the leading edge 24 and trailing edge 26 of the blade shells 12a, 12b. The upper mold 10b, including the upper blade shell 12b, is then lifted, turned and placed on top of the lower blade mold 10a in order to bond the two blade half shells 12a, 12b together along the leading and trailing edges 24, 26 and to bond the shear webs 16 to an inner surface 28 of the upper blade shell 12b. The step of placing one mold half on top of the other is referred to as closing the mold.

Referring now to FIG. 1C, a problem can arise when the mold 10 is closed whereby the shear webs 16 may move slightly relative to the upper shell 12b. For example, the shear webs 16 may move slightly under their own weight during mold closing or they may be dislodged by contact with the upper shell 12b. The concave curvature of the upper shell 12b also has a tendency to force the shear webs 16 together slightly, as shown in FIG. 1C. Such movement of the shear webs 16 during mold closing may result in the shear webs 16 being bonded to the upper shell 12b at a sub-optimal position.

Furthermore, there are various techniques which require employing permanent fixtures to guide the shear webs during mold closure. An example of which is provided in U.S. Patent Publication No. 2017/0151711, the contents of which are hereby incorporated in its entirety, including the web guide structures. However, use of such permanent fixtures adversely impact the blade weight, as well as increasing design complexity and costs, impacting the designed structure of the blade by becoming parasitic to blade structure in use. Moreover, the prior methods had to be part of the initial blade design There thus remains a need for an efficient and economic method and system for providing support for the webs/structure elements during the assembly phase of wind turbine devices that ensure proper placement of the shear web and facilitate a one-step mold closure, without impacting the structure of the product.

Accordingly, in order to close a blade in a one-step process, the blade must be designed to be built with free-standing structural elements to support a one-step close, or additional structural elements must be added to provide support. In accordance with the present disclosure, supports are frangible, i.e., designed to fail under certain specific conditions. These supports can be made of multiple materials or combinations of materials to facilitate the assembly of the wind blade.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes an apparatus, comprising a blade, including first and second spar caps; a first wall coupled to the first spar cap; a second wall coupled to the second spar cap; a shear web coupled to at least the first spar cap; and a frangible support coupled to the shear web and the first wall, wherein the frangible support is configured to fail under a predefined condition.

In some embodiments, the frangible support includes a first leg and a second leg, with a frangible connection disposed therebetween. In some embodiments, the predefined condition is a stress threshold amount. In some embodiments, the predefined condition is a load vector, e.g. the load vector is oriented orthogonally to a longitudinal axis of the support. In some embodiments, the frangible portion is located at a midpoint of the support, includes a weakened section, includes a pull cord, and/or is oriented at approximately 45 degrees relative to the shear web. In some embodiments, a plurality of frangible support members are provided with at least two frangible support members spaced approximately 12.5 meters apart.

In accordance with another aspect of the disclosure, a method of assembling a wind turbine blade is provided which comprises: providing a first blade half; providing a second blade half; providing a shear web, the shear web coupled to the first blade half; coupling a frangible support to the shear web and the first blade half; and triggering the frangible support to fail.

In some embodiments, triggering the frangible support to fail includes pulling a cord to disengage a frangible connecting portion from the remainder of the support. In some embodiments, triggering the frangible support to fail includes applying a stress in excess of a threshold amount. In some embodiments, triggering the frangible support to fail includes applying a load along a vector oriented at an angle to the longitudinal axis of the support. In some embodiments, triggering the frangible support to fail includes positioning the second blade half on top of the first blade half. In some embodiments, the method further comprises removing the frangible support from the assembled blade.

In some embodiments, the frangible support is oriented at approximately 45 degrees relative to the shear web. In some embodiments, the frangible support is coupled to the shear web at approximately the midpoint of the shear web. In some embodiments, the method further comprises providing a plurality of frangible support members, at least two frangible support members spaced approximately 12.5 meters apart. In some embodiments, the method further comprises providing a second frangible support member, and coupling the second frangible support to the shear web and the second blade half.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

Reference will now be made in detail to exemplary embodiments of the disclosed subject matter, an example of which is illustrated in the accompanying drawings. The method and corresponding steps of the disclosed subject matter will be described in conjunction with the detailed description of the system.

Figure 1A:
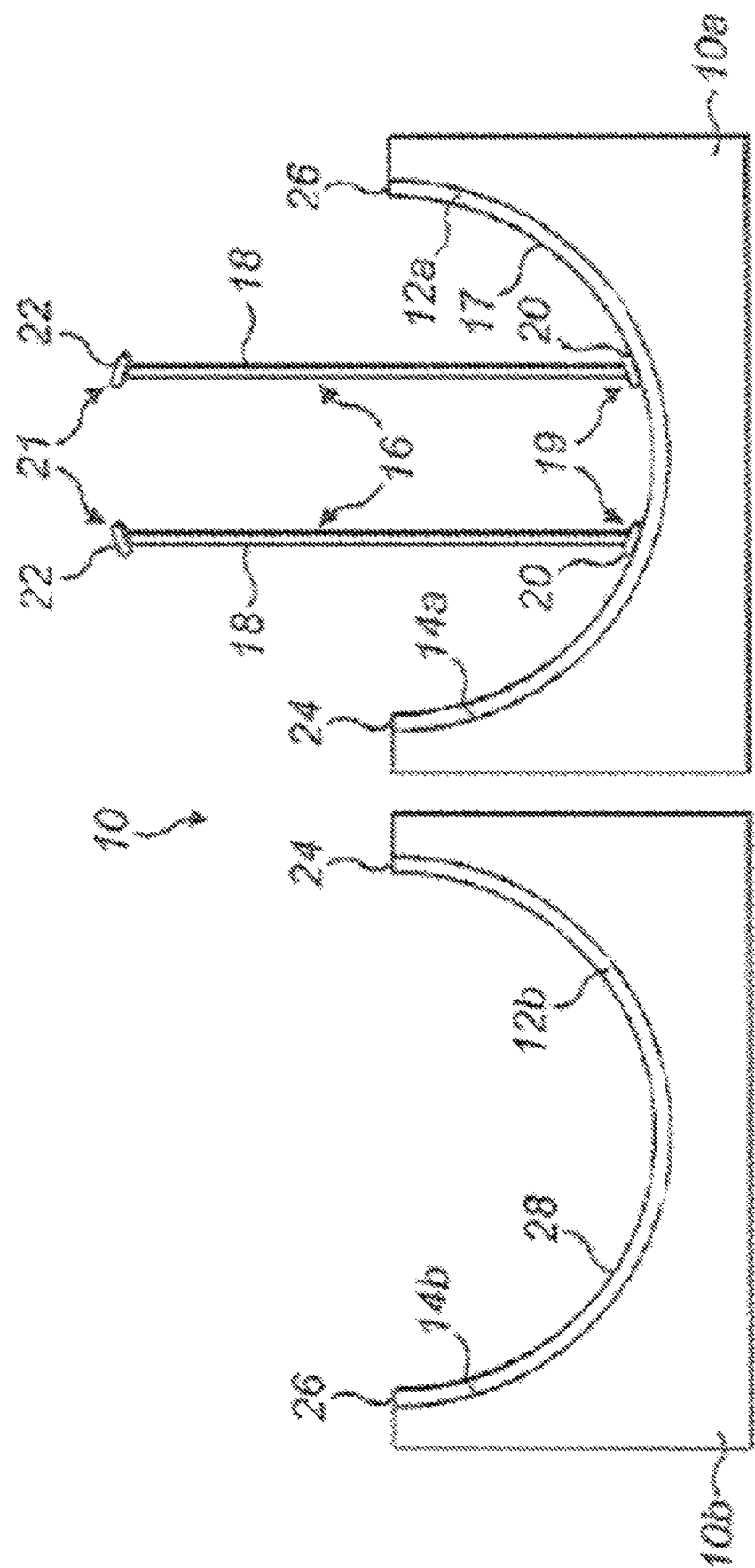
FIGS. 1A-C depict cross-sectional views of a conventional wind turbine blade mold and manufacturing method.
Figure 1B:
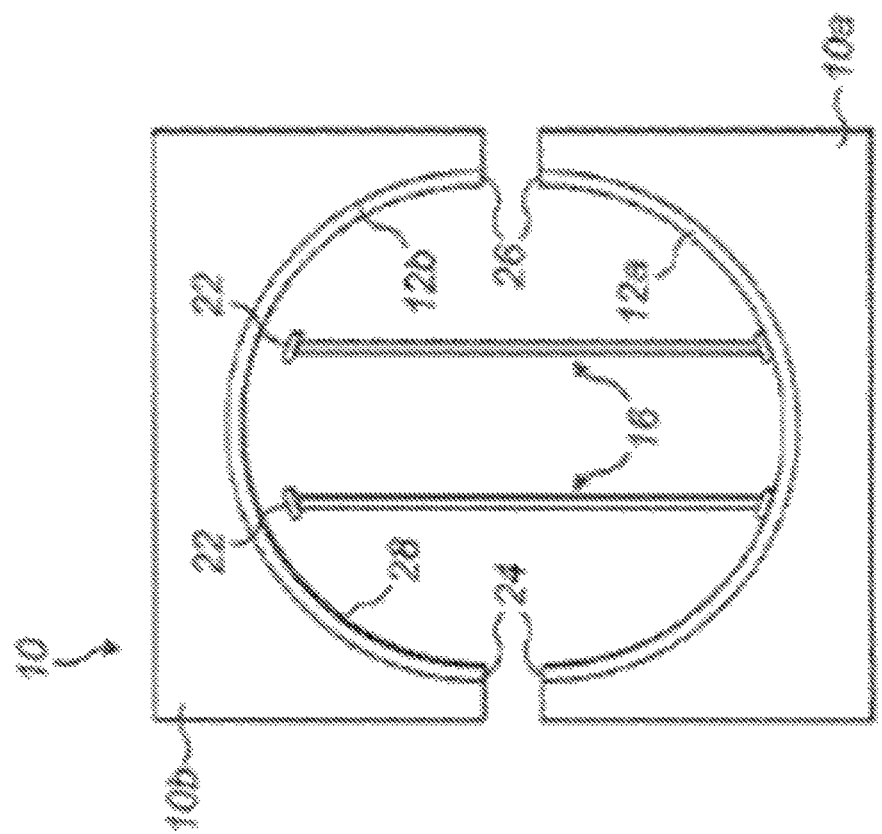
Figure 1C:
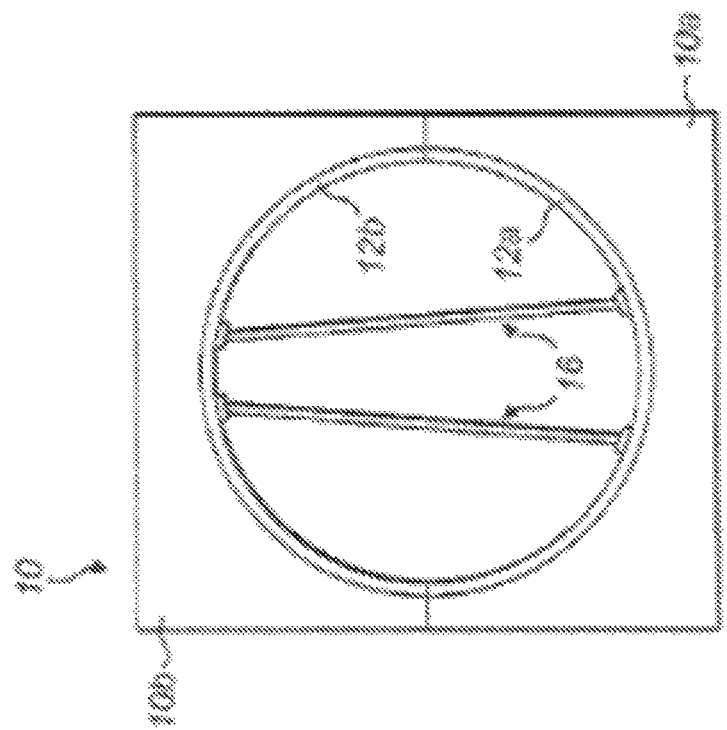
Figure 2:
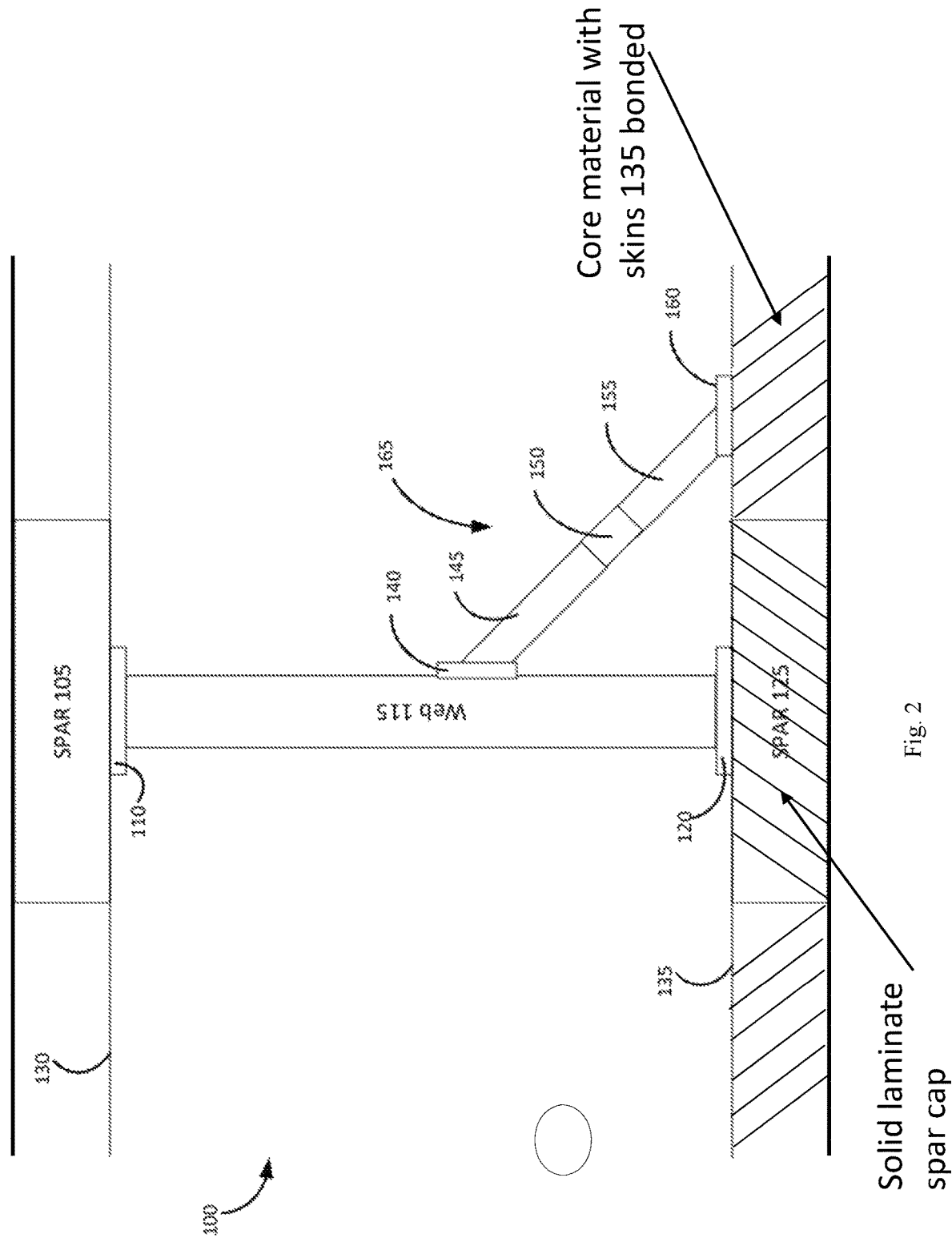
FIG. 2 is a cross-section of a blade with a frangible support in accordance with an embodiment of the present disclosure.

The methods and systems presented herein may be used for large structure construction. The disclosed subject matter is particularly suited for construction of wind turbine blades. For purpose of explanation and illustration, and not limitation, an exemplary embodiment of the system in accordance with the disclosed subject matter is shown in FIG. 2 and is designated generally by reference character 100. Similar reference numerals (differentiated by the leading numeral) may be provided among the various views and Figures presented herein to denote functionally corresponding, but not necessarily identical structures.

As shown in FIG. 2, shear web 115 is bonded on the upper end (or suction side) to spar cap 105. In the embodiment shown, the blade skin 130 can extend between the web 115 and the spar cap 105 such that an inner/lower surface of the spar cap 105 is bonded to, or integral with, the blade skin. An upper surface of the web 115 can be bonded to the inner surface of the blade skin 130. Similarly, the opposite end of shear web 115 is bonded to spar cap 125 on the lower (or pressure side) such that an inner/upper surface of the spar cap 125 is bonded to, or integral with, the blade skin 135, and a lower surface of the web 120 can be bonded to the inner surface of the blade skin 135.

In some embodiments the spar caps can be formed as discrete elements which are coupled to the blade skin 130, 135. In other embodiments, the spar caps are formed as components which are woven or blended into the blade skin so as to form an integral coupling. For example, the spar cap 105 can be incorporated during the molding process into the blade shell such that a skin ply extends across the spar cap (on both the inside of the shell and the outer surface of the shell). The shear web 115, and corresponding spar caps 105, 125, extend longitudinally along the blade span.

Although only a single shear web 115 is depicted in the exemplary embodiment, additional shear webs can be employed within the scope of the present disclosure. Furthermore, although the shear web 115 is depicted as an I-beam construction, alternative shear web configurations can be employed, e.g. split beams having generally a U-shape or V-shape construction, if so desired.

In some embodiments, shear web 115 is mounted to internal wall 130 using mount 110. Mount 110 is attached to internal wall 130 using a structural adhesive. Likewise, web 115 can be mounted to internal wall 135 using mount 120. Mount 120 is attached to internal wall 135 using a structural adhesive. In various embodiments, a structural adhesive may need to cure to completely adhere to a structure.

In accordance with an aspect of the disclosure, shear web 115 is supported by support 165. Support 165 includes mount 140, mount 160, a first reinforcing leg 45, second reinforcing leg 155, and connection portion 150.

Figure 3:
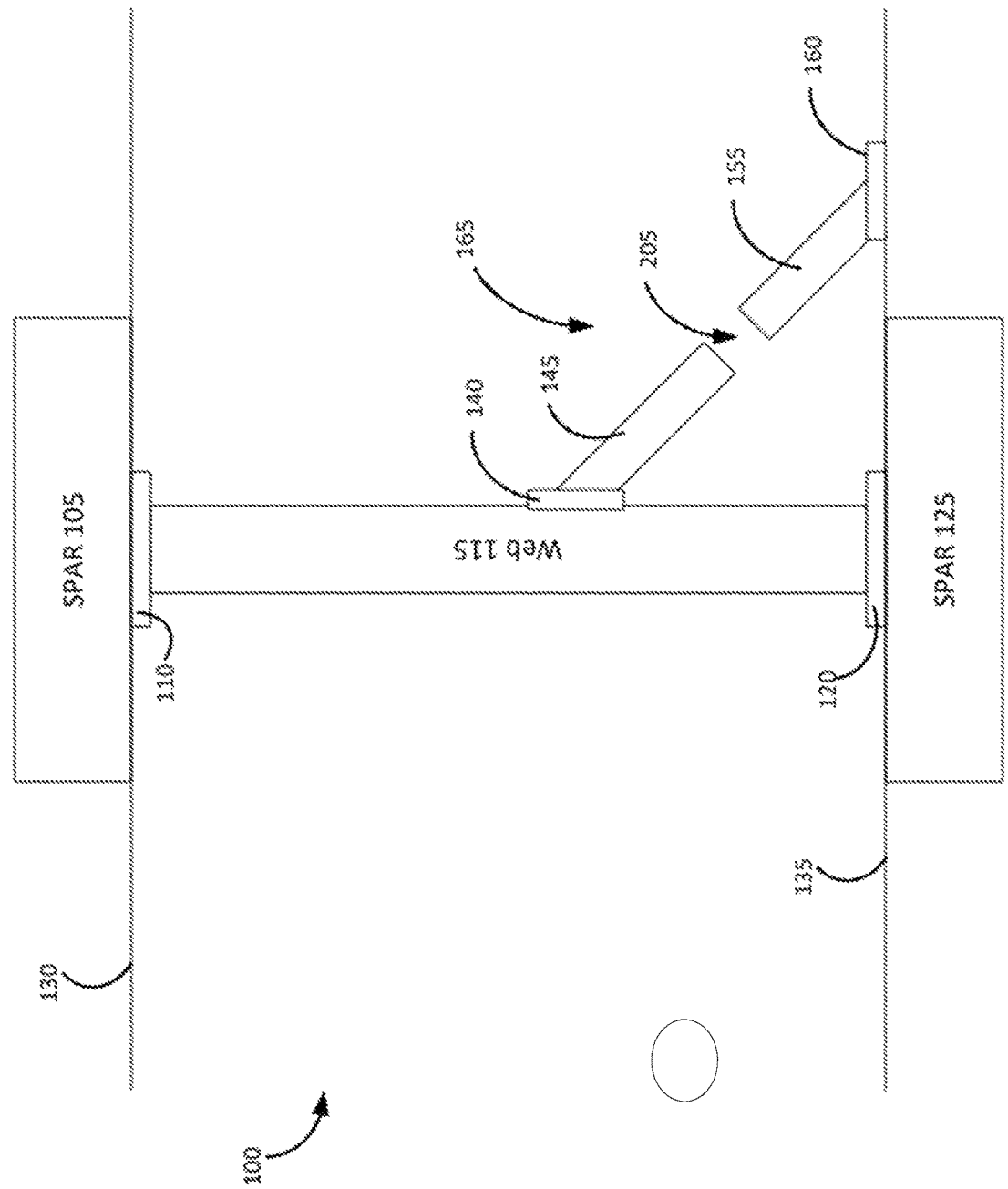
FIG. 3 is cross-section of a blade with a frangible support in a second state in accordance with an embodiment of the present disclosure.

Connecting portion 150 is a frangible section configured to "fail" under specific conditions, as shown in FIG. 3. That is, support 165 contains a frangible element/section, which is designed to "fail" (e.g. sever, rupture, detach, transform, etc.) under a load that is different than the load the support is meant to carry when performing the function of maintaining the position of the shear web 115 in the blade during the time the adhesive (bond paste) cures.

In some embodiments the triggering event which causes the connecting portion 150 to fail is a predetermined load threshold (which can be quantified in terms of stress/strain exhibited on the support 165). Additionally or alternatively, the triggering event which causes the connecting portion 150 to fail can be the load vector (e.g. a load applied along an improper direction/vector). Additionally or alternatively, the triggering event which causes the connecting portion 150 to fail can be a release mechanism which breaks the load transfer path through support 165. For example, the release mechanism can be a release lever which displaces connecting portion 150 relative to legs 145, 165. In some embodiments the release mechanism can be a cord/cable which attaches (e.g. via releasable pin) to connecting portion 150 and extends outside of the blade mold (including when both upper and lower halves are assembled) and allows for an operator to pull (e.g. laterally) which could "break" the support 165 (even though it has adequate strength to support the shear web in position when loaded along the axis of legs 145 and 155).

Support 165 is mounted to the web 115 and lower skin 135 using mount 140 and mount 160, respectively. Mount 140 is attached to web 115 using a fast setting adhesive. Mount 160 is attached to internal wall 135 using a fast setting adhesive. In some embodiments the mounts 140, 160 can be rigidly attached to the legs 145, 155. In other embodiments the mounts 140, 160 can be coupled to the legs 145, 155 to permit relative movement between the legs/mounts. For example, the mounts 140, 160 can be pivotably attached (e.g. via hinges, ball joint, etc.) so that the mount can rotate to conform to any contour that may be present in the inner surfaces of the blade skins. In the exemplary embodiment depicted, the support 165 is configured such that mount 160 is spaced from spar cap 125 (i.e. is attached to the skin at a location adjacent to the spar cap 125). In some embodiments, the mount 160 can be located, partially or entirely, above the spar cap 125.

The support 165 can be coupled to the shear web 115 at a wide range of angles (with respect to the longitudinal/vertical axis of the web 115). In the exemplary embodiment shown, the angle is approximately a 45 degrees. However, this angle can be adjusted as desired such that in some embodiments (e.g., ones incorporating a heavier shear web 115), the angle between the web 115 and support 165 is smaller, thereby transferring a larger component of the weight of the web 115 through the support 165. Conversely, the angle between the web 115 and support 165 can be increased, resulting in a support 165 which provides more lateral support and stability to prevent or inhibit any undesired lateral shifting of the web 115 (but receiving less of the vertical load from the web 115).

Additionally, the connection points for mounts 140, 160 can influence the angle of the support 165 with respect to the web 115. In some embodiments a minimum height relative to the height of the shear web can be prescribed. For example, in some embodiments the angle of support 165 can be dictated/defined in terms of mount locations, with the mount 140 at a position no less than approximately 25% of the height of the shear web 115 and no more than approximately 75% of the height of the shear web 115. In some embodiments the angle of support 165 may be no less than 30 degrees and no more than 60 degrees.

Additionally, or alternatively, a plurality of supports 165 can be employed at select locations along the blade span. In some embodiments, the supports 165 are equidistant from each other. In other embodiments the supports 165 can be arranged with varied density/concentration along the blade span so as to provide greater support in a certain region (e.g. root) of the blade than in others (e.g. tip). Also, the supports can be provided on only a single side of the shear web 115, as shown, or alternatively can be located on both sides of the web 115.

In accordance with an aspect of the disclosure, the use of as few supports 165 as possible is desired—while ensuring the positional tolerance of the shear web is maintained during the cure time. In some embodiments, a minimum of three supports 165 are provided—located at root end, mid-span and within 12.5 m of tip end. In some embodiments, the minimum number of supports 165 required is the number to span the length of the shear web with a maximum spacing of 12.5 m with supports located at the root end of the shear web and within 12.5 m of the tip end of the shear web.

As shown in FIG. 3, the frangible connecting portion 150 failed, as designed, at the location shown by arrow 205. As a result, any load applied to the shear web 115 is absorbed/transferred entirely through the web. The designed failure of support 165 has removed the structural support and therefore any impedance to the movement of the shear web 115. In other words, the support 165 provides enhanced rigidity and support to prevent or inhibit displacement of the shear web, until the frangible connecting section 150 fails, which results in a free standing shear web 115. In the embodiments shown, the frangible portion 150 is located at a midpoint of the support 165. However, the frangible portion can be located at the connection point of either of, or both, mounts 140,160 or any location therebetween.

Figure 4:
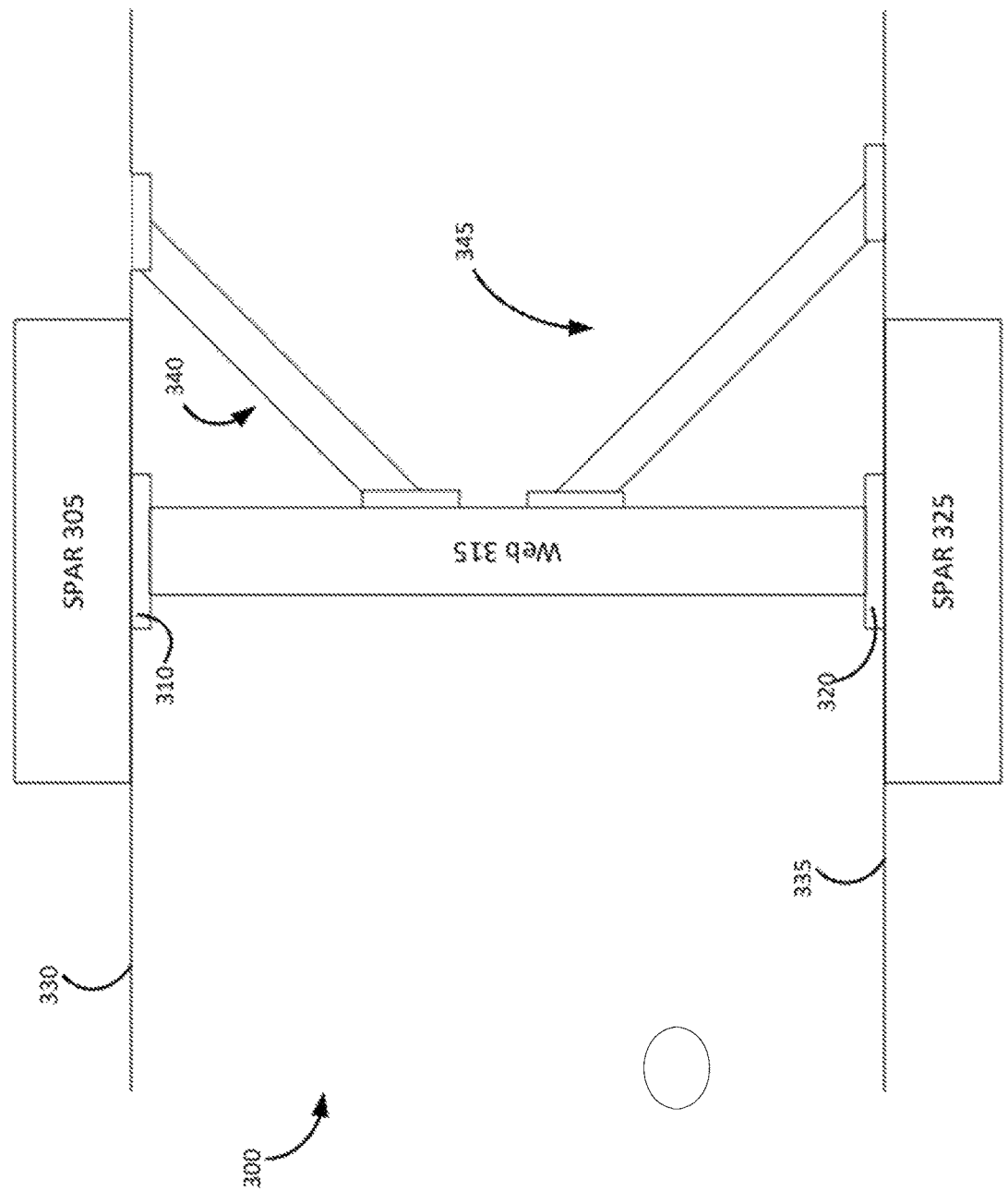
FIG. 4 is a cross-section of a blade with multiple frangible supports in place in accordance with an embodiment of the present disclosure.

FIG. 4 is a simplified illustration of an alternate embodiment of a frangible support within a system, in accordance with an embodiment of the present disclosure. System 300 includes spar 305, mount 310, web 315, mount 320, spar 325, internal skins 330, 335. In this embodiments, system 300 includes two frangible supports, frangible support 340 and frangible support 345. As shown, the frangible portion 340 does not comprise an alternate or distinct geometry from the remainder of the support 345. This can be achieved, for example, by providing the frangible portion which is inherently weaker, via a difference in material composition, from the remainder of the support 345, as described below. When a specified amount of stress is placed on system 300, the frangible supports 340, 345 shall fail, as designed, allowing for the support to be readily removed from the final blade construction.

The frangible section can be formed in a variety of ways. For example, the support can be formed with a weakened section (e.g. notch, scoring or perforation) that yields once the force applied reaches a predetermined threshold. In some embodiments, the frangible section can include a phase change material (e.g. paraffin or a eutectic) that loses rigidity, e.g. melts upon application of a catalyst.

Additionally or alternatively, the support can be formed with varied material properties, e.g. non-homogeneous composition along the support length, such that the frangible section yields once a predetermined condition is realized. The predetermined condition can be a load amount, localized temperature, or via application of a material (e.g. acid/enzyme) that deteriorates the structural integrity of the frangible portion. In some embodiments, the frangibility threshold can be a result of a load applied in a direction (or plane) orthogonal to the primary load orientation carried by the supports 340, 345. In such embodiments, the strength of the frangible element can be greater than the load required (applied in an orthogonal plane) to break the support 340, 345 after the shear web has been bonded in place. For purpose of illustration and not limitation, an exemplary load required to fracture the frangible element can be less than 25 kgs.

In some embodiments, the support (including the frangible portion(s)) can be formed with sufficient structural integrity and strength to withstand all forces applied during the assembly process, and subsequently fail/fracture as a result of loads carried by operation of the blade in the field. Variable wind loading causes deflection of the blade thereby imparting loads on the frangible element of the support causing fracture. The required force to fail the support can be greater than the load required to perform the function of the supporting the shear web, but not so large that the performance of the blade is affected by the internal stiffness of the support before the frangible element fails.

In some embodiments the frangible section is made of a foam (e.g. polyurethane), with the remainder of the support webs 145, 155 formed of a more rigid and permanent material, e.g. metal or wood. Additionally or alternatively, the supports can be made of fiberglass.

In some embodiments, the frangible portion does not "break" or become detached from the remainder of the support 165. For example, the frangible portion can include a hinge or latch which can be actuated to disconnect from the remainder of the support. In such embodiments, the frangible portion merely disconnects or severs the transfer of any forces within the support, but does not actually become physically decoupled from the remainder of the support.

According to an aspect of the disclosure, the current system provides a shear web structural support element that: i) provides enhanced rigidity and structural support to the shear web during blade assembly; ii) facilitates a one-step closure of the mold halves in a system that is free from external (to the blade) fixtures; and iii) is removable upon closure of the mold halves to result in a blade that is free of residual or non-essential blade structures.

Figure 5:
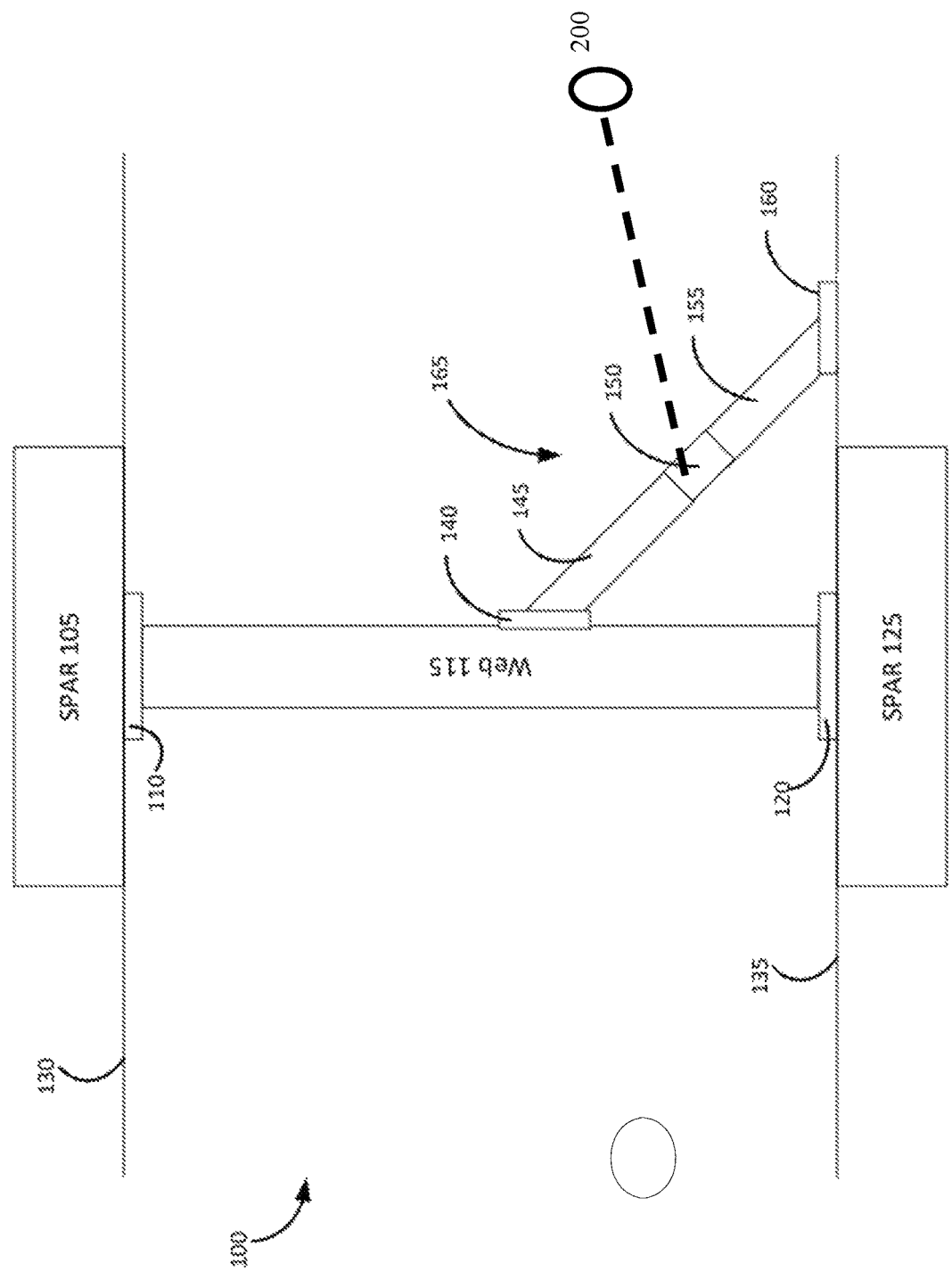
FIG. 5 is cross-section of a blade with a frangible support with a pull cord/cable for triggering failure/release of the frangible connection, in accordance with an embodiment of the present disclosure.

In operation, adhesive is applied along the leading and trailing edges of the respective half shells and along the longitudinally-extending flanges of the shear webs. Next, the first mold halve (e.g. the upper or suction side mold half) is then lifted, turned 180 degrees and placed on top of the other mold half. As the mold closes, any force applied to the shear web(s) are guided through the support element 165, which maintains the web 115 in an orientation that is substantially perpendicular to the local surface of the mold (and blade skin). Consequently, no shear forces are applied to the shear web(s) during mold closure. The absence of shear forces being applied allows for squeezing of the adhesive to ensure that a strong bond is created between the shear webs and the blade skin. As the upper blade half is placed on top of the shear web 115, the weight of the blade is gradually released to a point where the load being transmitted through the web 115 and support 165 reaches the predetermined threshold of frangible section 150 to rupture or disconnect the frangible portion. Additionally or alternatively, the frangible section(s) can be manually triggered to fail e.g. via a pull cord/cable 200, as shown in FIG. 5. After which, the entire load of the upper blade half is transmitted through the web 115.

In accordance with another aspect of the present disclosure, the support(s) 165, once the frangible portion is broken or deconstructed, does not transmit any force applied to the shear web 115. Furthermore, the support 165 can be removed from the interior of the blade. Thus, the final blade assembly does not impart any undesired weight, or influence the structural characteristics of the blade. As a result, the blade performance characteristics remain unchanged when in use in a wind turbine system. For example, the support 165 components, after the frangible section(s) has failed, can be removed from inside the blade by pulling them out through the root section (which remains open after assembly of the two mold halves).

In various embodiments, a web or structural element support can include a frangible portion. A frangible portion may be designed to fail under certain specific conditions to remove any structural impact of the web or structural element support on the final blade construction when the frangible portion has failed per design. In various embodiments, a frangible feature and/or portion can be the result of specific geometries of the frangible feature and/or portion. A frangible portion may be constructed and/or configured from a specific material designed to fail or change state under predetermined conditions. The methods and systems of the disclosed subject matter, as described above and shown in the drawings, provide for an efficient and economic system for providing support for the webs/structure elements during the assembly phase, e.g. mold closure, of wind turbine blades without impacting the structure of the blade.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A wind turbine blade apparatus, comprising:
   a blade, comprising:
      a first blade half, the first blade half including a first spar cap;
      a second blade half, the second blade half including a second spar cap;
      a shear web coupled to at least the first spar cap;
      a first mount attached to the shear web;
      a second mount attached to the second blade half; and
      a support having a first leg coupled to the first mount, and a second leg coupled to the second mount,
         wherein the support includes a frangible portion configured to fail under a predefined condition.

2. The apparatus of claim 1, wherein the first mount is rigidly attached to the shear web.

3. The apparatus of claim 1, wherein the second mount is rigidly attached to the second blade half.

4. The apparatus of claim 1, wherein the first leg is pivotably attached to the first mount to permit relative movement therebetween.

5. The apparatus of claim 1, wherein the second leg is pivotably attached to the second mount to permit relative movement therebetween.

6. The apparatus of claim 1, wherein the second mount is attached to the second blade half at a position spaced from the second spar cap.

7. The apparatus of claim 1, wherein a frangible connection is disposed between the first and second leg.

8. The apparatus of claim 7, wherein the first and second leg have a first material composition, and the frangible connection has a second material composition.

9. The apparatus of claim 1, wherein the frangible portion is disposed at the connection of the first leg and the first mount.

10. The apparatus of claim 1, wherein the frangible portion is disposed at the connection of the second leg and the second mount.

11. The apparatus of claim 1, wherein the first mount is located at a position between approximately 25%-75% of a height of the shear web.

12. A method of assembling a wind turbine blade comprising:
   providing a first blade half;
   providing a second blade half;
   providing a shear web, the shear web coupled to the second blade half;
   attaching a first mount to the shear web;
   attaching a second mount to the second blade half;
   coupling a frangible support to the first mount and the second mount;
   triggering the frangible support to fail.

13. The method of claim 11, wherein the frangible support includes a first leg pivotably coupled to the first mount, a second leg pivotably connected to the second mount, and a connection portion disposed between the first and second leg.

14. The method of claim 13, wherein triggering the frangible support to fail includes rupturing the connection portion.

15. The method of claim 13, wherein triggering the frangible support to fail includes detaching the connection portion.

16. The method of claim 13, wherein triggering the frangible support to fail includes displacing the connection portion.

17. The method of claim 13, wherein triggering the frangible support to fail includes operating a release mechanism disposed outside of the blade halves.

18. The method of claim 11, wherein triggering the frangible support to fail includes positioning the second blade half on top of the first blade half.

19. The method of claim 11, further comprising removing at least a portion of the frangible support from the assembled blade.

20. The method of claim 11, further comprising providing first and second frangible support members, the first frangible support member disposed on a first side of the shear web, and the second frangible support disposed on a second side of the shear web.

* * * * *